(12) United States Patent
Miyamoto et al.

(10) Patent No.: US 7,907,171 B2
(45) Date of Patent: Mar. 15, 2011

(54) NOTEBOOK INFORMATION PROCESSOR AND PROJECTIVE TRANSFORMATION PARAMETER CALCULATING METHOD

(75) Inventors: Satoshi Miyamoto, Ishikawa (JP); Nobuhisa Yamazaki, Ishikawa (JP); Jiyun Du, Ishikawa (JP); Masanari Takabatake, Ishikawa (JP)

(73) Assignee: PFU Limited (JP)

( * ) Notice: Subject to any disclaimer, the term of this patent is extended or adjusted under 35 U.S.C. 154(b) by 391 days.

(21) Appl. No.: 12/248,637

(22) Filed: Oct. 9, 2008

(65) Prior Publication Data

US 2009/0262199 A1 Oct. 22, 2009

(30) Foreign Application Priority Data

Apr. 18, 2008 (JP) ................................. 2008-109302

(51) Int. Cl.
*H04N 5/225* (2006.01)

(52) U.S. Cl. ...................... 348/207.1; 348/373; 348/552; 348/376; 348/222.1; 348/241; 382/275; 361/679.26; 361/679.28

(58) Field of Classification Search ............... 348/207.1, 348/373, 552, 376, 222.1, 241; 382/275; 361/679.26, 629.28; 345/618, 625, 633, 345/634, 667, 682, 628

See application file for complete search history.

(56) References Cited

U.S. PATENT DOCUMENTS

| 2004/0022451 | A1* | 2/2004 | Fujimoto et al. ............... 382/275 |
| 2005/0206753 | A1* | 9/2005 | Sakurai et al. ................. 348/241 |
| 2008/0151099 | A1* | 6/2008 | Lin et al. ........................ 348/376 |
| 2008/0279454 | A1* | 11/2008 | Lev et al. ........................ 382/181 |
| 2009/0231483 | A1* | 9/2009 | Seddik et al. .................. 348/373 |
| 2009/0262200 | A1* | 10/2009 | Takabatake et al. ......... 348/207.1 |
| 2009/0262204 | A1* | 10/2009 | Pai et al. ................... 348/207.11 |
| 2009/0262209 | A1* | 10/2009 | Pai et al. ..................... 348/222.1 |

FOREIGN PATENT DOCUMENTS

JP 2006-074512 A 3/2006

* cited by examiner

*Primary Examiner* — Jason Chan
*Assistant Examiner* — Usman Khan
(74) *Attorney, Agent, or Firm* — Lowe Hauptman Ham & Berner, LLP

(57) ABSTRACT

A notebook information processor includes a lid including an image photographing unit and a display, and a main body, wherein the control unit includes a live view displaying unit that displays a live view obtained by photographing at least a portion of the main body within a photographing area of the image photographing unit on the display, a rectangle detecting unit that detects a rectangle for calculating a projective transformation parameter from the live view, a projective transformation parameter calculating unit that calculates the projective transformation parameter from a coordinate of the rectangle, and a still image obtaining unit that performs a projective transformation on the live view so as to obtain a live view photographed from a front direction, using the projective transformation parameter, obtains a still image from the live view after the projective transformation, and stores the still image in the storage unit.

12 Claims, 7 Drawing Sheets

FIG.5
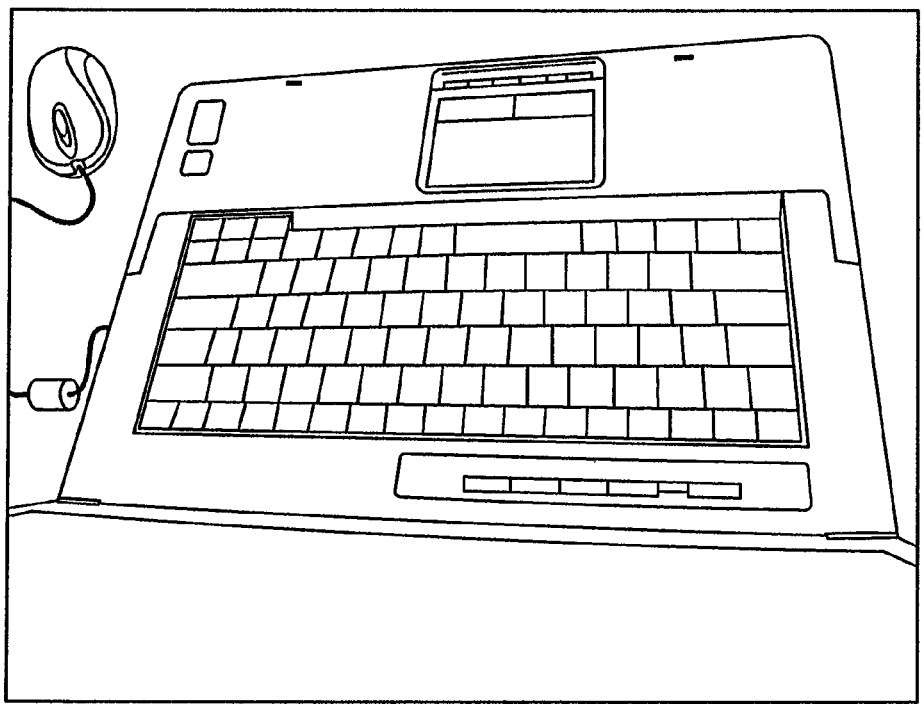
BEFORE PROJECTIVE TRANSFORMATION
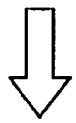
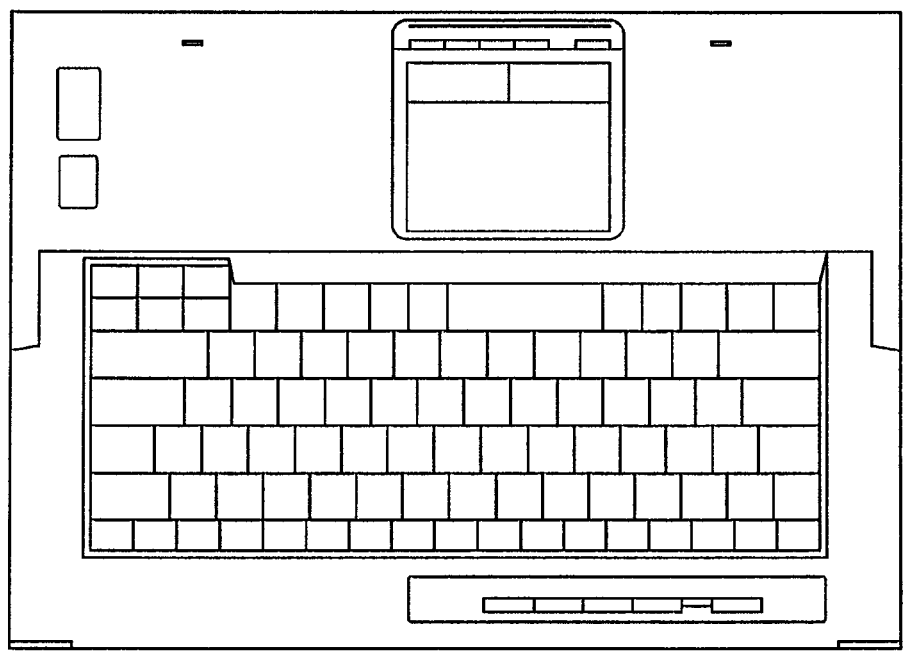
AFTER PROJECTIVE TRANSFORMATION

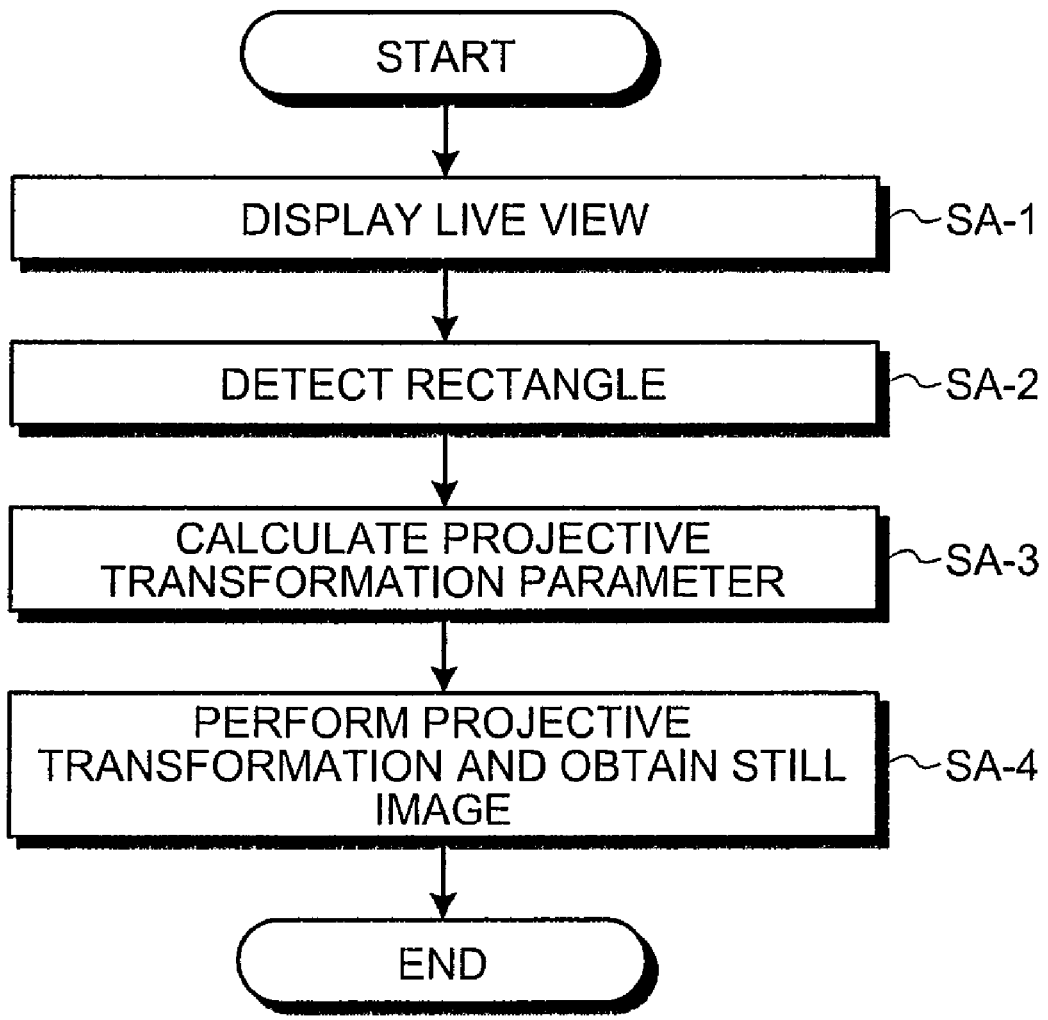

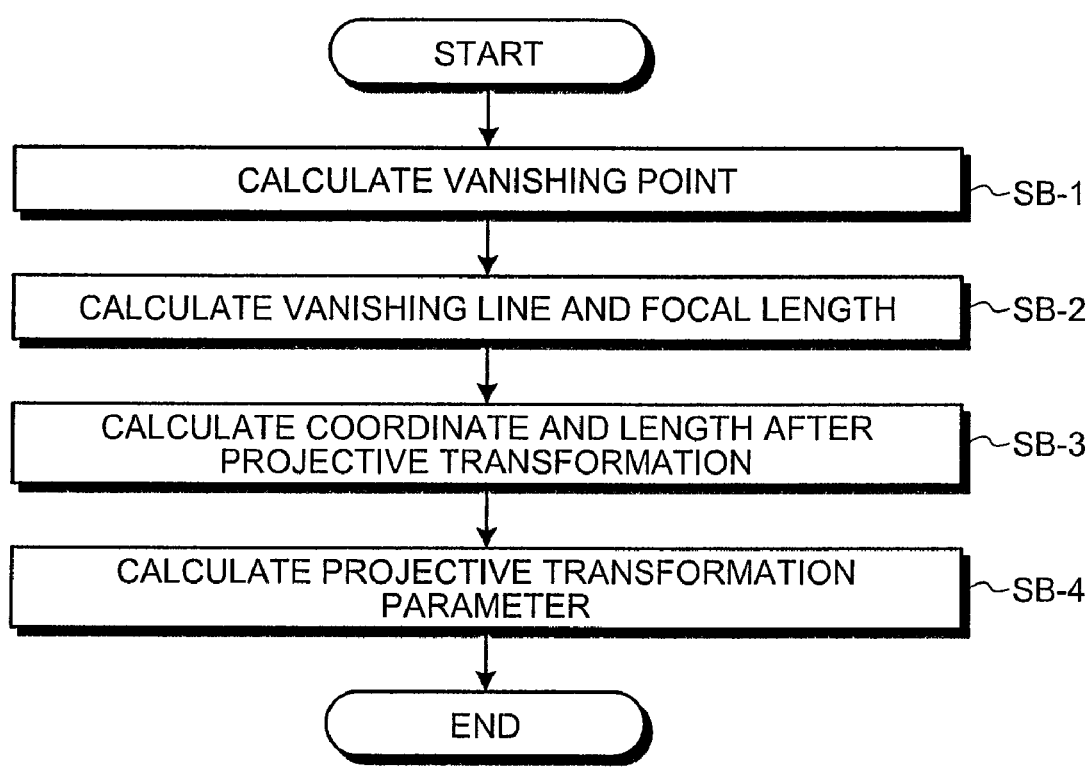

NOTEBOOK INFORMATION PROCESSOR AND PROJECTIVE TRANSFORMATION PARAMETER CALCULATING METHOD

RELATED APPLICATIONS

The present application is based on, and claims priority from, Japan Application Number 2008-109302, filed Apr. 18, 2008, the disclosure of which is hereby incorporated by reference herein in its entirety.

BACKGROUND OF THE INVENTION

1. Field of the Invention

The present invention relates to a notebook information processor, and projective transformation parameter calculating method.

2. Description of the Related Art

With a notebook information processor such as conventional PDA terminal and laptop type PC, by way of example, when a user such as a businessman wants to scan a document such as a paper document not at his desk in an office with a well-equipped environment but at a meeting, when visiting a customer, and in a hotel of a business trip destination, it is required to additionally bring a portable scanner or a digital camera.

When additionally bringing the portable scanner, a general commercially available notebook information processor and a portable scanner weigh about 1 to 2 kg and 1.4 kg, respectively, so that they weigh about 3 kg in total and are too heavy for the user to bring. In addition, the user has to keep an installation area of both the notebook information processor and the scanner when scanning.

Therefore, although the digital camera is often used in place of the portable scanner without bringing the latter, in this case, however, it is difficult to straightforwardly photograph the document without using a tripod or the like, so that it is required to convert the document photographed by the digital camera as if this is straightforwardly photographed.

That is to say, when using the notebook information processor such as a notebook personal computer and the digital camera in place of the image scanner, it is required to use a technique to correct distortion of a viewpoint when photographing by an existing projective transformation technique.

Conventionally, there is a technique to calculate a projective transformation parameter for performing the projective transformation on the document as if this is straightforwardly photographed in an over head projector (OHP) type photographing device or the like.

For example, the OHP-type photographing device disclosed in JP-A-2006-74512 uses the rectangle of the outline of the seat of which shape is known as the reference polygon, and compares the rectangle with the rectangle identified by the contour of the seat image, thereby obtaining the projective transformation parameter.

However, in the conventional projective transformation technique (such as JP-A-2006-74512), for example, the rectangular seat of which four corners are square is required as the rectangle used for calculating the projective transformation parameter, and there is a problem that when the four corners of the seat are not square and the seat is not rectangular, the rectangular figure of which four corners are square is required to be separately provided or the apex signs such as the corner marks are required to be drawn on the seat so as to detect the coordinates of the four corners of the seat.

SUMMARY OF THE INVENTION

It is an object of the present invention to at least partially solve the problems in the conventional technology.

A notebook information processor according to one aspect of the present invention, includes a lid including an image photographing unit and a display, and a main body including a storage unit and a control unit, wherein the control unit includes a live view displaying unit that displays a live view obtained by photographing at least a portion of the main body within a photographing area of the image photographing unit on the display, a rectangle detecting unit that detects a rectangle for calculating a projective transformation parameter from the live view displayed on the display by the live view displaying unit, a projective transformation parameter calculating unit that calculates the projective transformation parameter from a coordinate of the rectangle detected by the rectangle detecting unit, and a still image obtaining unit that performs a projective transformation on the live view so as to obtain a live view photographed from a front direction, using the projective transformation parameter calculated by the projective transformation parameter calculating unit, obtains a still image from the live view after the projective transformation, and stores the still image in the storage unit.

A projective transformation parameter calculating method according to another aspect of the present invention is executed by a notebook information processor, including a lid including an image photographing unit and a display, and a main body including a storage unit and a control unit. The method includes a live view displaying step of displaying a live view obtained by photographing at least a portion of the main body within a photographing area of the image photographing unit on the display, a rectangle detecting step of detecting a rectangle for calculating a projective transformation parameter from the live view displayed on the display by the live view displaying unit, a projective transformation parameter calculating step of calculating the projective transformation parameter from a coordinate of the rectangle detected by the rectangle detecting unit, and a still image obtaining step of performing a projective transformation on the live view so as to obtain a live view photographed from a front direction, using the projective transformation parameter calculated by the projective transformation parameter calculating unit, obtains a still image from the live view after the projective transformation, and stores the still image in the storage unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a view showing one example of images before and after the projective transformation according to the embodiment;

FIG. 6 is a flowchart showing one example of a still image obtaining process of the notebook information processor according to the embodiment; and FIG. 7 is a flowchart showing one example of a projective transformation parameter calculating process of the notebook information processor according to the embodiment.

DETAILED DESCRIPTION OF THE PREFERRED EMBODIMENTS

The following describes an embodiment of a notebook information processor and a projective transformation parameter calculating method for such a device and a method according to the present invention in detail with reference to the drawings. The embodiment is illustrative only, and is not intended to limit the present invention in any way.

OVERVIEW OF THE INVENTION

The following outlines the present invention, and then, a configuration and processing of the present invention are explained in detail with reference to FIG. 1.

The invention has schematically following basic features.

Figure 1:
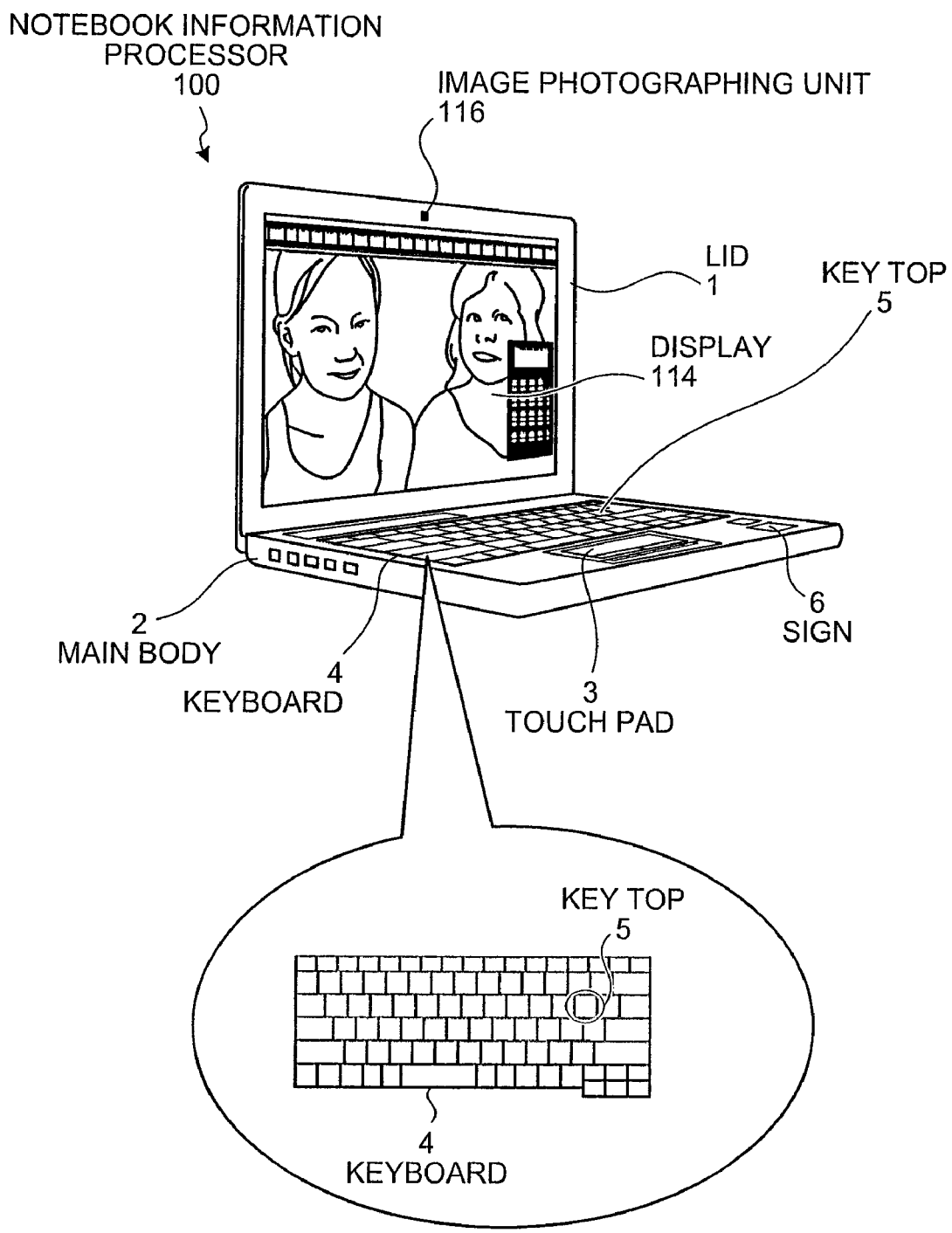
FIG. 1 is an outline drawing showing one example of a configuration of the notebook information processor.

As shown in FIG. 1, the notebook information processor 100 is composed of a lid 1 including at least an image photographing unit 116 and a display 114, and a main body 2 including at least a storage unit and a control unit. The main body 2 includes a touch pad 3 and a keyboard 4 formed of at least one key top 5, and a rectangular sign 6 is displayed on an upper surface of the main body 2.

The control unit of the notebook information processor 100 displays a live view obtained by photographing at least a portion of the main body 2 within a photographing area of the image photographing unit 116 on the display 114.

The "live view" is a moving image and a still image photographed by the image photographing unit 116, displayed on the display 114 such that a user may check in real time for adjusting the photographing area of the image photographing unit 116.

The control unit of the notebook information processor 100 detects a rectangle (such as the main body 2, the touch pad 3, the keyboard 4, a shape of the key top 5, and the rectangular sign 6) for calculating a projective transformation parameter from the live view displayed on the display 114. A dimension of the rectangle for calculating the projective transformation parameter is not necessarily known, and one having a rectangular shape may be used.

The control unit of the notebook information processor 100 may detect at least a portion of the touch pad 3 as the rectangle for calculating the projective transformation parameter. The control unit of the notebook information processor 100 may detect at least a portion of the keyboard 4 as the rectangle for calculating the projective transformation parameter. The control unit of the notebook information processor 100 may detect at least a portion of the shape of at least one key top 5 forming the keyboard 4 as the rectangle for calculating the projective transformation parameter. The control unit of the notebook information processor 100 may detect at least a portion of the sign 6 as the rectangle for calculating the projective transformation parameter. The control unit of the notebook information processor 100 may detect at least a portion of an appearance of the main body 2 as the rectangle for calculating the projective transformation parameter.

The control unit of the notebook information processor may allow the user to specify in advance the rectangular shape to be detected for calculating the projective transformation parameter. That is to say, the control unit of the notebook information processor 100 may allow the user to specify the rectangle (such as the main body 2, the touch pad 3, the keyboard 4, the shape of the key top 5, and the rectangular sign 6) for calculating the projective transformation parameter, from the live view displayed on the display 114, using an input unit (such as the touch pad 3 and the mouse).

The control unit of the notebook information processor 100 calculates the projective transformation parameter from a coordinate of the detected rectangle (such as the main body 2, the touch pad 3, the keyboard 4, the shape of the key top 5, and the rectangular sign 6).

The control unit of the notebook information processor 100 performs the projective transformation on the live view to obtain the live view photographed from a front direction using the calculated projective transformation parameter, obtains the still image of a document put on the main body 2 from the live view after the projective transformation, and stores the still image in the storage unit.

The "document" is a photographing object (subject) of the still image by the image photographing unit 116, and includes not only a planar one such as a paper document but also a stereoscopic one.

Configuration of the Notebook Information Processor 100

The following first describes a configuration of a notebook information processor 100 with reference to FIGS. 2 to 5.

Figure 2:
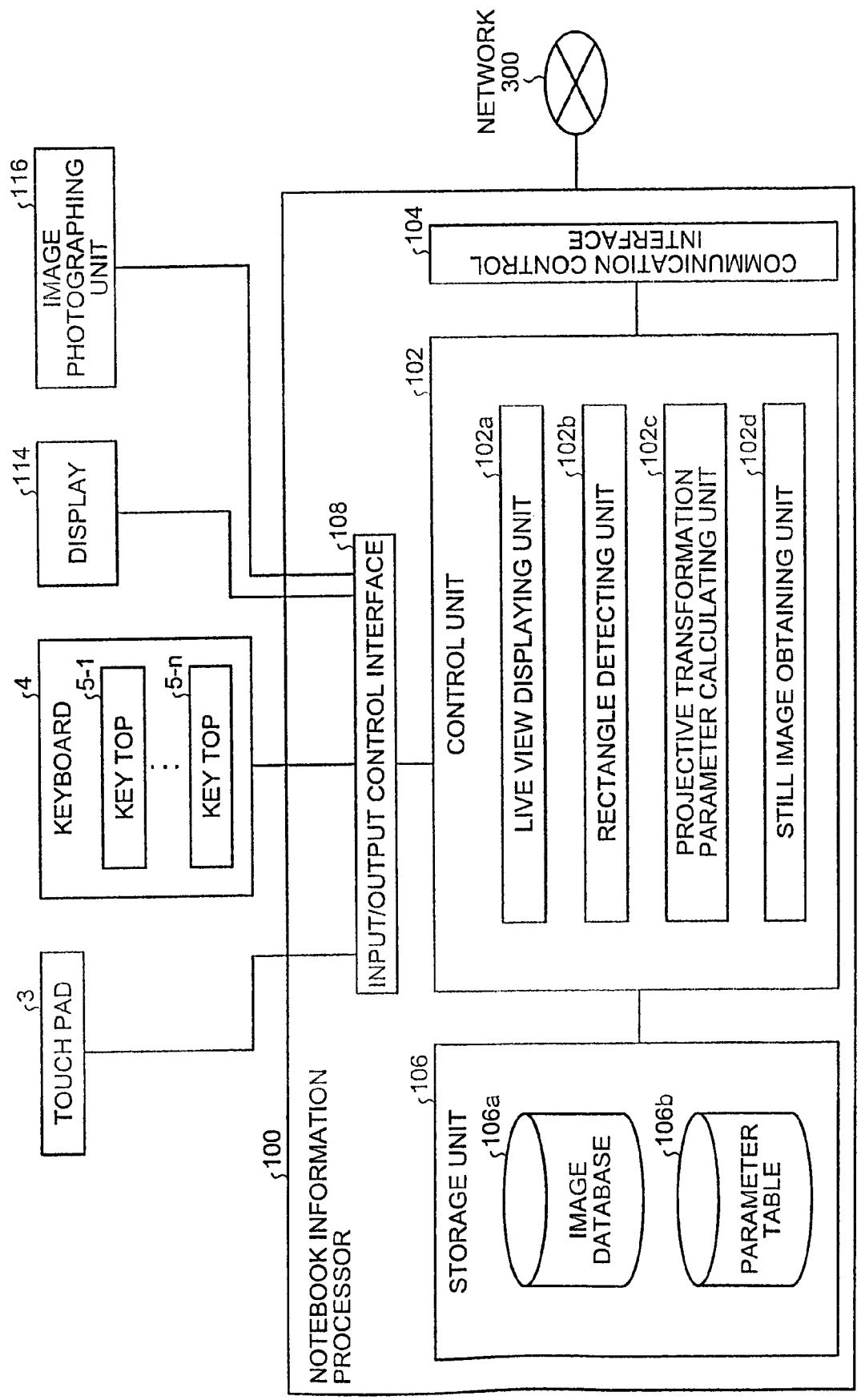
FIG. 2 is a block diagram showing one example of a configuration of the notebook information processor.

FIG. 2 conceptually shows only parts related to the present invention.

As shown in FIG. 2, in general, the notebook information processor 100 is provided with the keyboard 4 formed of at least one key top 5, the touch pad 3, the display 114, the image photographing unit 116, the storage unit 106, control unit 102, an input/output control interface 108, and a communication control interface 104.

In FIG. 2, the control unit 102 is formed by a Central Processing Unit (CPU) which controls the notebook information processor 100 totally, or the like. The communication control interface 104 connects to a communication device (not shown) such as a router connected to a communication channel or the like, and the input/output control interface 108 connected to the keyboard 4 formed of at least one key top 5, the touch pad 3, the display 114, and the image photographing unit 116. The storage unit 106 stores various databases and tables. The units composing the notebook information processor 100 are communicatably connected through an optional communication channel. Further, the notebook information processor 100 are communicatably connected to a network 300 via a communication device such as a router, and a wired or wireless communication line such as a dedicated line.

In FIG. 2, the image photographing unit 116 is a video camera or a digital camera that has a function to photograph the moving image for the live view obtained by photographing at least a portion of the main body 2 within the photographing area, and is formed of, for example, a charge coupled device (CCD). The image photographing unit 116 may be incorporated in the notebook information processor 100. The image photographing unit 116 may be detachably placed in the notebook information processor 100, electrified by the notebook information processor 100, and communicatably connected to the notebook information processor 100 (for example, a USB-connected WEB camera or digital camera may be used as the image photographing unit 116). The image photographing unit 116 may be rotatably placed in the notebook information processor 100 such that a photographing direction is changeable.

The notebook information processor 100 may further have a rotational angle sensor (not shown) that detects a rotational angle when rotated so as to change the photographing direction of the image photographing unit 116. The notebook information processor 100 may have the lid 1 in which at least the image photographing unit 116 is placed, and the main body 2 in which at least the keyboard 4 is placed, and may further have an open angle sensor (not shown) that detects an open angle of the lid 1 with respect to the main body 2, and a motor (not shown) that adjusts the rotational angle of the image photographing unit 116. The rotational angle sensor and the open angle sensor have a function to detect a rotational angle γ of the image photographing unit 116 and an open angle θ of the notebook information processor 100, and is, for example, a gyro sensor that detects an angular speed and the angle. The motor has a function to rotate the image photographing unit 116.

In FIG. 2, the various databases and tables (such as an image database 106*a* and parameter table 106*b*) stored in the storage unit 106 are storage units such as fixed disk devices. The storage units store various programs, various tables, various databases, and the like used in various processes.

Out of each component of the storage unit 106, the image database 106*a* stores various moving images and still images, and for example, stores the moving images and the still images after various image processings (such as the projective transformation) by the control unit 102, in addition to the moving image of the live view photographed by the image photographing unit 116 and the still image of the document put on the main body 2.

The parameter table 106*b* stores the projective transformation parameter calculated from the coordinate of the rectangle (such as the main body 2, the touch pad 3, the keyboard 4, the shape of the key top 5, and the rectangular sign 6) detected by the control unit 102.

The communication control interface 104 controls communication between the notebook information processor 100 and a network 300 (or a communication device such as a router). That is to say, the communication control interface 104 has a function to communicate data to another terminal through a communication line. The communication control interface 104 may have a function to communicate data to the image photographing unit 116 detachably connected to the notebook information processor 100 through the communication line.

The input/output control interface 108 controls the keyboard 4 formed of at least one key top 5, the touch pad 3, the display 114, and the image photographing unit 116. The keyboard 4 corresponds to the keyboard placed in the main body 2, and the display 114 corresponds to the display (monitor) placed in the lid 1.

The control unit 102 has an internal memory that stores a control program such as an operating system (OS), a program defining various procedures, and required data. The control unit 102 performs information processing for executing various processings by the programs or the like. The control unit 102 conceptually has a live view displaying unit 102*a*, a rectangle detecting unit 102*b*, a projective transformation parameter calculating unit 102*c*, and a still image obtaining unit 102*d*.

Out of them, the live view displaying unit 102*a* displays the live view obtained by photographing at least a portion of the main body 2 within the photographing area of the image photographing unit 116 on the display 114.

The rectangle detecting unit 102*b* detects the rectangle (such as the main body 2, the touch pad 3, the keyboard 4, the shape of the key top 5, and the rectangular sign 6) for calculating the projective transformation parameter from the live view displayed on the display 114 by the live view displaying unit 102*a*.

The rectangle detecting unit 102*b* may detect at least a portion of the touch pad 3 as the rectangle for calculating the projective transformation parameter. The rectangle detecting unit 102*b* may detect at least a portion of the keyboard 4 as the rectangle for calculating the projective transformation parameter. The rectangle detecting unit 102*b* may detect at least a portion of the shape of at least one key top 5 forming the keyboard 4 as the rectangle for calculating the projective transformation parameter. The rectangle detecting unit 102*b* may detect at least a portion of the sign 6 (such as the rectangular label adhered in advance for the projective transformation and the rectangular label normally adhered (such as the Windows (registered trademark) label)) as the rectangle for calculating the projective transformation parameter. The rectangle detecting unit 102*b* may detect at least a portion of the appearance of the main body 2 as the rectangle for calculating the projective transformation parameter.

The rectangle detecting unit 102*b* may allow the user to specify in advance the rectangular shape to be detected for calculating the projective transformation parameter. That is to say, the rectangle detecting unit 102*b* may allow the user to specify the rectangle (such as the main body 2, the touch pad 3, the keyboard 4, the shape of the key top 5, and the rectangular sign 6) for calculating the projective transformation parameter from the live view displayed on the display 114, using an optional input unit such as the touch pad 3 and the mouse.

The projective transformation parameter calculating unit 102*c* calculates the projective transformation parameter from the coordinate of the rectangle (such as the main body 2, the touch pad 3, the keyboard 4, the shape of the key top 5, and the rectangular sign 6) detected by the rectangle detecting unit 102*b*, and stores the projective transformation parameter in the parameter table 106*b*. A detail of a projective transformation parameter calculating process performed by the projective transformation parameter calculating unit 102*c* is described in the following projective transformation parameter calculating process.

The still image obtaining unit 102*d* performs the projective transformation on the live view displayed on the display 114 by the live view displaying unit 102*a* so as to obtain the live view photographed from the front direction, using the projective transformation parameter calculated by the projective transformation parameter calculating unit 102*c*, obtains the still image of the document put on the main body 2 from the live view after the projective transformation, and stores the still image in the image database 106*a*.

The projective transformation performed by the still image obtaining unit 102*d* is explained with reference to FIGS. 3 and 4.

The projective transformation performed by the still image obtaining unit 102*d*, for example, is executed by restoring the image photographed by the image photographing unit 116 to an original state by using an inverse projective transformation. An example of the projective transformation is explained below. When performing the projective transformation, a vanishing point of the image on an imaging plane 70 being an image plane photographed by the image photographing unit 116 is obtained. For example, when an imaging plane shape 71 being an image shape on the imaging plane 70 is the rectangle (such as the main body 2, the touch pad 3, the keyboard 4, the shape of the key top 5, and the rectangular sign 6) as shown in FIG. 3, the two vanishing points S1 and S2 are obtained. The vanishing point is the point at which extended lines of two straight lines, which are formed parallel in an actual shape, cross to each other, when projecting a predetermined shape. By thus obtaining the vanishing point, an original size before the projection and the projective transformation parameters (a11 to a32) being the parameters when performing the projective transformation are obtained based on the vanishing point, and the projective transformation is performed using a following [Equation 1]. That is to say, the projective transformation is performed by obtaining a coordinate (u,v,1) after the projective transformation from a coordinate (x,y,1) before the projective transformation by the [Equation 1].

$$\begin{pmatrix} u \\ v \\ 1 \end{pmatrix} = \frac{1}{a31x + a32 + 1} \begin{pmatrix} a11 & a12 & a13 \\ a21 & a22 & a23 \\ a31 & a32 & 1 \end{pmatrix} \begin{pmatrix} x \\ y \\ 1 \end{pmatrix}$$ [Equation 1]

Figure 4:
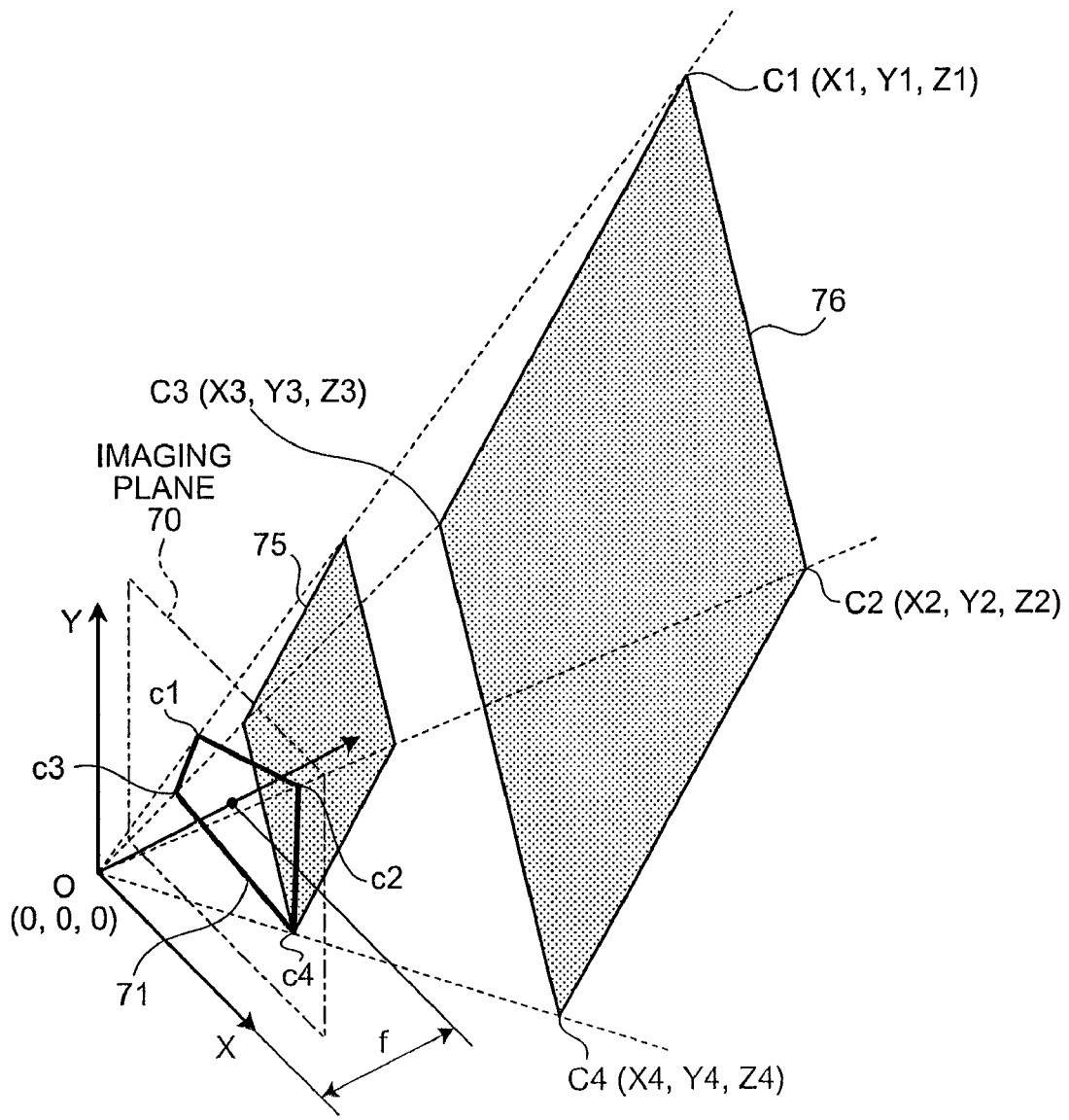
FIG. 4 is a view showing one example of the projective transformation according to the embodiment.

By thus performing the projective transformation on the coordinate of the imaging plane shape 71, which is the coordinate before the projective transformation, a projectively transformed shape 75, which is the shape after the projective transformation, may be obtained as shown in FIG. 4 by obtaining the coordinate after the projective transformation. The projectively transformed shape 75 is similar to an original shape 76, which is the shape when seeing the original imaged by the image photographing unit 116 from the front direction, that is to say, the shape when seeing the imaged plane in the vertical direction. Various conventional technologies other than the above-described technique may be used as the projective transformation.

An example of the image after the projective transformation performed by the still image obtaining unit 102*d* is explained with reference to FIG. 5.

As shown in FIG. 5, an upper portion in FIG. 5 is a view of the live view before the projective transformation obtained by photographing at least a portion of the main body 2 within the photographing area of the image photographing unit 116, displayed on the display 114 by the live view displaying unit 102*a*. A lower portion in FIG. 5 is a view of the still image obtained from the live view after the projective transformation obtained by performing the projective transformation on the live view before the projective transformation displayed on the display 114 by the live view displaying unit 102*a* so as to obtain the live view photographed from the front direction, using the projective transformation parameter calculated by the projective transformation parameter calculating unit 102*c*.

Processing of the Notebook Information Processor 100

The following describes in detail one example of a still image obtaining process of the notebook information processor 100 according to the embodiment as configured above with reference to FIGS. 6 and 7.

Still Image Obtaining Process

The following describes details of the still image obtaining process with reference to FIG. 6.

As shown in FIG. 6, the live view displaying unit 102*a* displays the live view obtained by photographing at least a portion of the main body 2 within the photographing area of the image photographing unit 116 on the display 114 (step SA-1).

The rectangle detecting unit 102*b* detects the rectangle (such as the main body 2, the touch pad 3, the keyboard 4, the shape of the key top 5, and the rectangular sign 6) for calculating the projective transformation parameter from the live view displayed on the display 114 by the process by the live view displaying unit 102*a* (step SA-2).

The rectangle detecting unit 102*b* may detect at least a portion of the touch pad 3 as the rectangle for calculating the projective transformation parameter. The rectangle detecting unit 102*b* may detect at least a portion of the keyboard 4 as the rectangle for calculating the projective transformation parameter. The rectangle detecting unit 102*b* may detect at least a portion of the shape of at least one key top 5 forming the keyboard 4 as the rectangle for calculating the projective transformation parameter. The rectangle detecting unit 102*b* may detect at least a portion of the sign 6 as the rectangle for calculating the projective transformation parameter. The rectangle detecting unit 102*b* may detect at least a portion of the appearance of the main body 2 as the rectangle for calculating the projective transformation parameter.

The projective transformation parameter calculating unit 102*c* calculates the projective transformation parameter from the coordinate of the rectangle (such as the main body 2, the touch pad 3, the keyboard 4, the shape of the key top 5, and the rectangular sign 6) detected by the process by the rectangle detecting unit 102*b*, and stores the projective transformation parameter in the parameter table 106*b* (step SA-3). The projective transformation parameter calculating process performed by the projective transformation parameter calculating unit 102*c* at the step SA-3 is described in detail in a following projective transformation parameter calculating process.

The still image obtaining unit 102*d* performs the projective transformation as described above on the live view displayed on the display 114 by the process by the live view displaying unit 102*a* so as to obtain the live view photographed from the front direction using the projective transformation parameter calculated by the process by the projective transformation parameter calculating unit 102*c*, obtains the still image of the document put on the main body 2, and stores the still image in the image database 106*a* (step SA-4).

Projective Transformation Parameter Calculating Process

The following describes details of a projective transformation parameter calculating process performed by the projective transformation parameter calculating unit 102*c* at step the above-described SA-3 with reference to FIG. 7.

Figure 3:
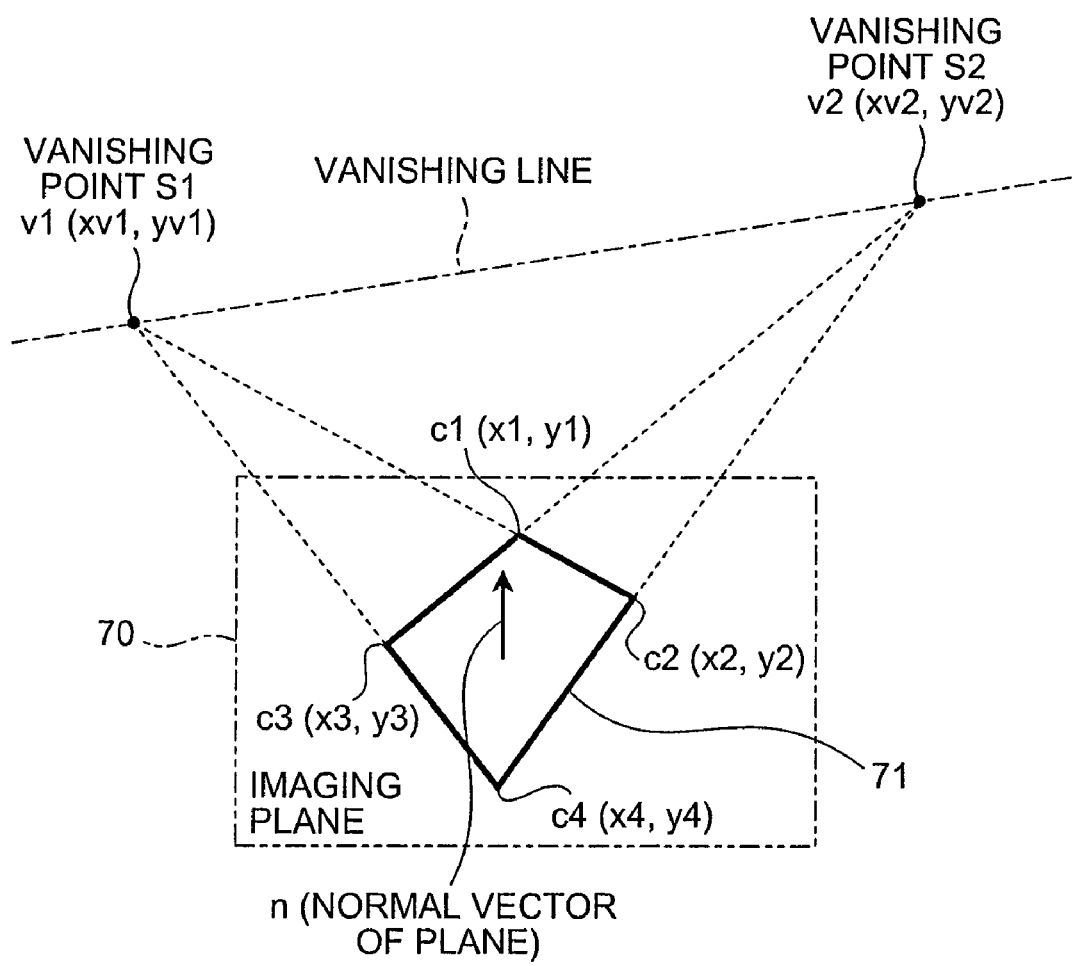
FIG. 3 is a view showing one example of a projective transformation according to the embodiment.

As shown in FIG. 7, the projective transformation parameter calculating unit 102*c* calculates the vanishing point used in law of painting such as law of perspective based on the coordinate (c1 (x1,y1) to c4 (x4,y4) in FIG. 3) of the rectangle (imaging plane shape 71 in FIG. 3) for calculating the projective transformation parameter detected by the process by the rectangle detecting unit 102*b* from the photographed image such as the moving image photographed by the image photographing unit 116 (step SB-1). The coordinates of the vanishing points S1 and S2 calculated by the process by the projective transformation parameter calculating unit 102*c* are represented in a following [Equation 2].

$$v1(x1,y1), v2(x2,y2)$$ [Equation 2]

The projective transformation parameter calculating unit 102*c* calculates a vanishing line indicating an angle of the subject on a three-dimensional space by assigning the coordinates of the vanishing points S1 and S2 in the [Equation 2] calculated at the step SB-1 to the following [Equation 3], and the projective transformation parameter calculating unit 102*c* calculates a focal length f (vertical distance f to the imaging plane 70 in FIG. 4) by assigning the coordinates of the vanishing points S1 and S2 in the [Equation 2] to the following [Equation 4] (step SB-2).

$$(y1-y2)x+(x2-x1)y+x1y2-x2y1=0$$ [Equation 3]

$$f=\sqrt{-x1 \cdot x2 - y1 \cdot y2}$$ [Equation 4]

The projective transformation parameter calculating unit 102*c* calculates the coordinates (C1 (X1,Y1,Z1) to C4 (X4, Y4,Z4) in FIG. 4) of four corners and horizontal and vertical lengths of the rectangle (original shape 76 in FIG. 4) on the three-dimensional space by the vanishing points, the vanishing line, and the focal length calculated at the steps SB-1 and SB-2 and the following perspective transformation equation [Equation 5] (step SB-3).

$$x = f\frac{X}{Z}$$
$$y = f\frac{Y}{Z}$$
[Equation 5]

The projective transformation parameter calculating unit 102c calculates the projective transformation parameters (a11 to a32) of the [Equation 6] by the coordinate (x,y,1) before the projective transformation detected at the step SB-1 and the coordinate (u,v,1) after the projective transformation calculated at the step SB-3 (step SB-4). Various conventional technologies other than the above-described technique may be used as the projective transformation parameter calculation.

$$\begin{pmatrix} u \\ v \\ 1 \end{pmatrix} = \frac{1}{a31x + a32 + 1}\begin{pmatrix} a11 & a12 & a13 \\ a21 & a22 & a23 \\ a31 & a32 & 1 \end{pmatrix}\begin{pmatrix} x \\ y \\ 1 \end{pmatrix}$$
[Equation 6]

In this way, the projective transformation parameter calculating unit 102c calculates the projective transformation parameter from the coordinate of the rectangle (such as the main body 2, the touch pad 3, the keyboard 4, the shape of the key top 5, and the rectangular sign 6) detected by the rectangle detecting unit 102b, and stores the projective transformation parameter in the parameter table 106b.

Other Embodiments

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

For example, in the embodiment, the notebook information processor 100 performs various processes as a stand-alone device. However, the notebook information processor 100 can be configured to perform processes in response to request from a client terminal, which is a separate unit, and return the process results to the client terminal.

All the automatic processes explained in the present embodiment can be, entirely or partially, carried out manually. Similarly, all the manual processes explained in the present embodiment can be, entirely or partially, carried out automatically by a known method.

The process procedures, the control procedures, specific names, information including registration data for each process and various parameters such as search conditions, display example, and database construction, mentioned in the description and drawings can be changed as required unless otherwise specified.

The constituent elements of the notebook information processor 100 are merely conceptual and may not necessarily physically resemble the structures shown in the drawings. For instance, the apparatus need not necessarily have the structure that is illustrated.

For example, the process functions performed by each device of the notebook information processor 100, especially the each process function performed by the control unit 102, can be entirely or partially realized by CPU and a computer program executed by the CPU or by a hardware using wired logic. The computer program, recorded on a recording medium to be described later, can be mechanically read by the notebook information processor 100 as the situation demands. In other words, the storage unit such as read-only memory (ROM) or hard disk (HD) stores the computer program that can work in coordination with OS to issue commands to the CPU and cause the CPU to perform various processes. The computer program is first loaded to the random access memory (RAM), and forms a control unit 102 in collaboration with the CPU.

Alternatively, the computer program can be stored in any application program server connected to the notebook information processor 100 via the network 300, and can be fully or partially loaded as the situation demands.

The computer-readable recording medium on which the computer program can be stored may be a portable type such as flexible disk, magneto optic (MO) disk, ROM, erasable programmable ROM (EPROM), electrically erasable programmable ROM (EEPROM), compact disk-read-only memory (CD-ROM), digital versatile disk (DVD), or a communication medium that stores the computer program for a short term such as communication channels or carrier waves that transmit the computer program over the network 300 such as local area network (LAN), wide area network (WAN), and the Internet.

Computer program refers to a data processing method written in any computer language and written method, and can have software codes and binary codes in any format. The computer program can be a dispersed form in the form of a plurality of modules or libraries, or can perform various functions in collaboration with a different program such as the OS. Any known configuration in the each device according to the embodiment can be used for reading the recording medium. Similarly, any known process procedure for reading or installing the computer program can be used.

The storage unit 106 is a fixed disk device such as RAM, ROM, and HD or flexible disk, optical disk, and stores therein various programs, tables, databases (such as the image database 106a and the parameter table 106b), and files required for various processes.

The notebook information processor 100 can also be connected to any existing personal computer, workstation, etc. and can be operated by executing software (that includes computer program, data, etc.) that implements the method according to the present invention in the personal computer or workstation.

The distribution and integration of the device are not limited to those illustrated in the figures. The device as a whole or in parts can be functionally or physically distributed or integrated in an arbitrary unit according to various attachments or how the device is to be used.

According to the present invention, it is not required to separately provide the seat for obtaining the rectangle for calculating the projective transformation parameter or the apex signs such as the corner marks. Thereby, the present invention has an effect of automatically and efficiently calculating the projective transformation parameter by detecting the specific rectangular shape in the live view, thereby obtaining the still image as if the document such as the paper document put on the main body 2 is photographed from the front direction.

According to the present invention, it is possible to detect the rectangle from the shape of the touch pad 3 normally equipped to the main body 2 or the like of the notebook information processor 100, thereby calculating the projective transformation parameter. Thereby, the present invention has an effect of efficiently calculating the projective transformation parameter without separately providing the rectangle for calculating the projective transformation parameter to the notebook information processor 100 having the touch pad 3.

According to the present invention, it is possible to detect the rectangle from the shape of the keyboard 4 normally equipped to the main body 2 or the like of the notebook information processor 100, thereby calculating the projective transformation parameter. Thereby, the present invention has an effect of efficiently calculating the projective transformation parameter without separately providing the rectangle for calculating the projective transformation parameter to the notebook information processor 100 having the keyboard 4.

According to the present invention, it is possible to detect the rectangle from the shape of the key top 5 of keyboard 4 normally equipped to the main body 2 or the like of the notebook information processor 100, thereby calculating the projective transformation parameter. Thereby, the present invention has an effect of efficiently calculating the projective transformation parameter without separately providing the rectangle for calculating the projective transformation parameter to the notebook information processor 100 having the keyboard 4.

According to the present invention, the sign 6 (such as the rectangular label (such as the Windows (registered trademark) label) normally adhered on the main body 2) or the like displayed on the main body 2 or the like of the notebook information processor 100 may be used.

According to the present invention, it is possible to use the entire main body 2 as the rectangle used for calculating the projective transformation parameter.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A notebook information processor, comprising:
    a lid including an image photographing unit and a display; and
    a main body including a storage unit and a control unit, wherein
    the control unit includes:
    a live view displaying unit that displays a live view obtained by photographing at least a portion of the main body within a photographing area of the image photographing unit on the display;
    a rectangle detecting unit that detects a rectangle for calculating a projective transformation parameter from the live view displayed on the display by the live view displaying unit;
    a projective transformation parameter calculating unit that calculates the projective transformation parameter from a coordinate of the rectangle detected by the rectangle detecting unit; and
    a still image obtaining unit that performs a projective transformation on the live view so as to obtain a live view photographed from a front direction, using the projective transformation parameter calculated by the projective transformation parameter calculating unit, obtains a still image from the live view after the projective transformation, and stores the still image in the storage unit.

2. The notebook information processor according to claim 1, wherein
    the main body further includes a touch pad; and
    the rectangle detecting unit detects at least a portion of the touch pad as the rectangle for calculating the projective transformation parameter.

3. The notebook information processor according to claim 1, wherein
    the main body further includes a keyboard; and
    the rectangle detecting unit detects at least a portion of the keyboard as the rectangle for calculating the projective transformation parameter.

4. The notebook information processor according to claim 3, wherein
    the rectangle detecting unit detects at least a portion of a shape of at least one key top forming the keyboard as the rectangle for calculating the projective transformation parameter.

5. The notebook information processor according to claim 1, wherein
    a rectangular sign is displayed on an upper surface of the main body; and
    the rectangle detecting unit detects at least a portion of the sign as the rectangle for calculating the projective transformation parameter.

6. The notebook information processor according to claim 1, wherein
    the rectangle detecting unit detects at least a portion of an appearance of the main body as the rectangle for calculating the projective transformation parameter.

7. A projective transformation parameter calculating method executed by a notebook information processor, including:
    a lid including an image photographing unit and a display; and
    a main body including a storage unit and a control unit,
    the method comprising:
    a live view displaying step of displaying a live view obtained by photographing at least a portion of the main body within a photographing area of the image photographing unit on the display;
    a rectangle detecting step of detecting a rectangle for calculating a projective transformation parameter from the live view displayed on the display by the live view displaying unit;
    a projective transformation parameter calculating step of calculating the projective transformation parameter from a coordinate of the rectangle detected by the rectangle detecting unit; and
    a still image obtaining step of performing a projective transformation on the live view so as to obtain a live view photographed from a front direction, using the projective transformation parameter calculated by the projective transformation parameter calculating unit, obtains a still image from the live view after the projective transformation, and stores the still image in the storage unit.

8. The projective transformation parameter calculating method according to claim 7, wherein
    the main body further includes a touch pad; and
    the rectangle detecting step is executed for detecting at least a portion of the touch pad as the rectangle for calculating the projective transformation parameter.

9. The projective transformation parameter calculating method according to claim 7, wherein
    the main body further includes a keyboard; and the rectangle detecting step is executed for detecting at least a portion of the keyboard as the rectangle for calculating the projective transformation parameter.

10. The projective transformation parameter calculating method according to claim 9, wherein the rectangle detecting step is executed for detecting at least a portion of a shape of at least one key top forming the keyboard as the rectangle for calculating the projective transformation parameter.

11. The projective transformation parameter calculating method according to claim 7, wherein a rectangular sign is displayed on an upper surface of the main body; and the rectangle detecting step is executed for detecting at least a portion of the sign as the rectangle for calculating the projective transformation parameter.

12. The projective transformation parameter calculating method according to claim 7, wherein the rectangle detecting step is executed for detecting at least a portion of an appearance of the main body as the rectangle for calculating the projective transformation parameter.

* * * * *